(12) United States Patent
Onnis et al.

(10) Patent No.: US 8,613,184 B2
(45) Date of Patent: Dec. 24, 2013

(54) CORE FOR RACKET STRING, RACKET STRING COMPRISING SUCH A CORE AND CORRESPONDING MANUFACTURING METHOD

(75) Inventors: Jean-Philippe Onnis, Genilac (FR); Rosemonde Maillet, Lyons (FR); Catherine Tartivel, Lyons (FR)

(73) Assignee: Babolat VS, Lyons (FR)

( * ) Notice: Subject to any disclaimer, the term of this patent is extended or adjusted under 35 U.S.C. 154(b) by 0 days.

(21) Appl. No.: 13/499,293

(22) PCT Filed: Sep. 30, 2010

(86) PCT No.: PCT/FR2010/052062
§ 371 (c)(1),
(2), (4) Date: Jun. 8, 2012

(87) PCT Pub. No.: WO2011/039482
PCT Pub. Date: Apr. 7, 2011

(65) Prior Publication Data
US 2012/0240547 A1 Sep. 27, 2012

(30) Foreign Application Priority Data
Oct. 1, 2009 (FR) ...................................... 09 56853

(51) Int. Cl.
*D02G 3/02* (2006.01)
*D02G 3/36* (2006.01)

(52) U.S. Cl.
USPC ............................................. 57/250; 57/258

(58) Field of Classification Search
USPC .......................................... 57/232, 250, 258
See application file for complete search history.

(56) References Cited

U.S. PATENT DOCUMENTS

| | | | |
|---|---|---|---|
| 4,033,582 A * | 7/1977 | Linden | ........................ 473/540 |
| 4,120,146 A | 10/1978 | Robin | |
| 4,306,410 A * | 12/1981 | Nakamura et al. | .............. 57/234 |
| 4,449,353 A | 5/1984 | Tayebi | |
| 4,707,977 A | 11/1987 | Cousin et al. | |
| 6,183,499 B1 * | 2/2001 | Fischer et al. | ................ 606/228 |
| 2010/0095827 A1 * | 4/2010 | Rheinnecker et al. | ....... 84/297 S |

FOREIGN PATENT DOCUMENTS

| | | |
|---|---|---|
| EP | 0 478 477 A1 | 4/1992 |
| GB | 600 424 A | 4/1948 |
| WO | 97/04150 A1 | 2/1997 |

OTHER PUBLICATIONS

International Search Report, dated Dec. 21, 2010, from corresponding PCT application.

* cited by examiner

*Primary Examiner* — Shaun R Hurley
(74) *Attorney, Agent, or Firm* — Young & Thompson

(57) ABSTRACT

This core (2) for a racket string, in particular for a tennis racket string, includes a thermoplastic matrix (24) in which filaments (22) are embedded, at least one of these filaments being of natural origin and the thermoplastic matrix (24) being made of a material which, at a temperature lower than a threshold temperature, at which the filaments (22) are not substantially damaged, has a viscosity making it suitable for an extrusion process. The matrix (24) includes a plurality of strands that are helically twisted in a first direction, each of the strands including a plurality of filaments (22) of natural origin that are helically twisted in a second direction, which is or is not opposite to the first direction.

20 Claims, 4 Drawing Sheets

CORE FOR RACKET STRING, RACKET STRING COMPRISING SUCH A CORE AND CORRESPONDING MANUFACTURING METHOD

BACKGROUND OF THE INVENTION

The present invention relates to a core for a racket string, in particular for a tennis racket string, a racket string comprising such a core, and a method for manufacturing such a core.

DESCRIPTION OF THE RELATED ART

In the field of strings used in particular in racket sports, there is a desire to incorporate natural materials so as to preserve the environment as much as possible. Furthermore, natural filaments, such as silk filaments, have a suitable mechanical strength for an application as tennis racket strings, as well as a greater elasticity than synthetic filaments. To that end, it is known to wish to incorporate a plurality of silk filaments into a string. This type of filament from silkworms is completely natural.

Known, from document GB 600424, is a method according to which, once the plurality of silk filaments is assembled, the thread thus obtained passes into an extruder head supplied with a thermoplastic polymer. The polymer matrix then constitutes a sheath for the natural thread. However, the method described in this document is difficult to industrialize. Furthermore, the core thus made does not have characteristics making it adapted to use as a racket string. It is also known from U.S. Pat. No. 4,707,977 to make the matrix from a thermoplastic material with a melting temperature lower than the deterioration temperature of the threads and whereof the viscosity allows a satisfactory impregnation of the threads.

That being specified, the present invention aims to propose a core for a racket string that has characteristics adapted for use as a racket string. The present invention also aims to propose a method for manufacturing said core, which can be carried out simply and reliably.

SUMMARY OF THE INVENTION

To that end, the invention relates to a core for a racket string, in particular for a tennis racket string, comprising a thermoplastic matrix in which filaments are embedded, at least one of these filaments being of natural origin and the thermoplastic matrix being made of a material which, at a temperature lower than a threshold temperature, at which the filaments are not substantially damaged, has a viscosity making it suitable for an extrusion process. This core for a racket string is characterized in that the matrix comprises a plurality of strands that are helically twisted in a first direction, each of the strands comprising a plurality of filaments or natural origin that are helically twisted in a second direction, which is or is not opposite the first direction.

According to other advantageous features of the core according to the invention, considered alone or according to all technically possible combinations:
- the threshold temperature is below 130° C., in particular equal to 110° C.;
- the threshold temperature defines the maximum value of a working temperature range, the minimum value of which corresponds to a threshold viscosity below which the material is adapted to said extrusion process;
- the minimum temperature is above 70° C., in particular equal to 90° C.;
- the threshold viscosity is below 2500 Pa·s, in particular equal to 1500 Pa·s at 100° C., this viscosity being measured according to standard ISO 1133;
- the viscosity of the material of the thermoplastic matrix is greater than 500 Pa·s at 100° C., this viscosity being measured according to standard ISO 1133;
- the threshold viscosity is below 180 Pa·s, in particular equal to 50 Pa·s, this viscosity being measured according to standard DIN 53018;
- the matrix comprises a single thermoplastic material;
- the matrix comprises a mixture of thermoplastic materials;
- the or at least one of the thermoplastic materials is polyamide or polyurethane;
- at least one of the filaments of natural origin is a silk filament;
- the core comprises at least one peripheral protective sheath.

Another aim of the present invention is a string for a racket comprising at least one core as described above.

Another aim of the present invention is a method for manufacturing a core for a racket string, in particular for a tennis racket string, the core comprising a plurality of filaments, the method comprising the following steps:
- helically twisting a plurality of filaments in a first direction, then twisting a plurality of strands, comprising a plurality of twisted filaments, helically in a second direction, which is or is not opposite the first direction,
- passing the plurality of filaments comprising at least one filament of natural origin, in a pretreatment liquid comprising a first thermoplastic material dissolved in a solvent, at ambient temperature and atmospheric pressure, and
- passing the plurality of filaments in an extruder head supplied with a second thermoplastic material which, at a temperature below a threshold temperature, for which the filaments are not substantially damaged, has a viscosity making it suitable for an extrusion process.

According to one advantageous feature, the speed of the filaments during the passage in the liquid is adapted to allow impregnation of the first thermoplastic material in each of the filaments.

BRIEF DESCRIPTION OF THE DRAWING FIGURES

Various other features and advantages of the invention will emerge from the following description, provided solely as a non-limiting example and done in reference to the appended drawings, in which.

Figure 4:
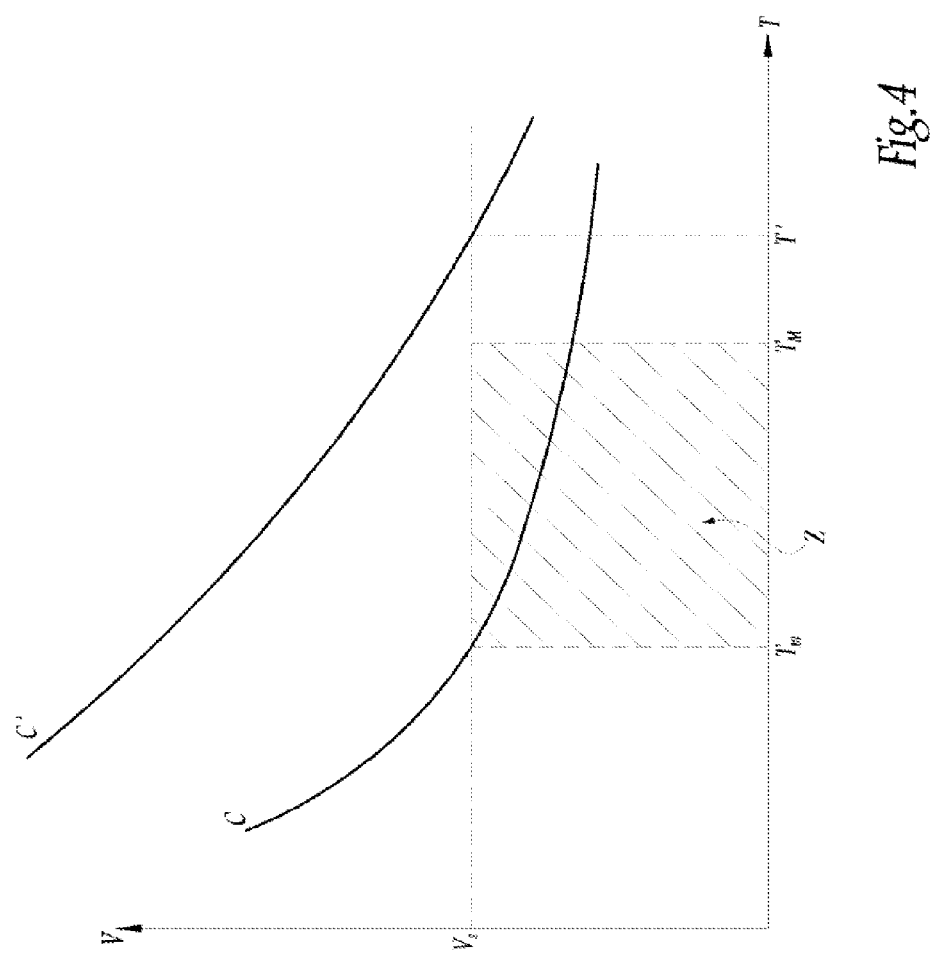
Figure 5:
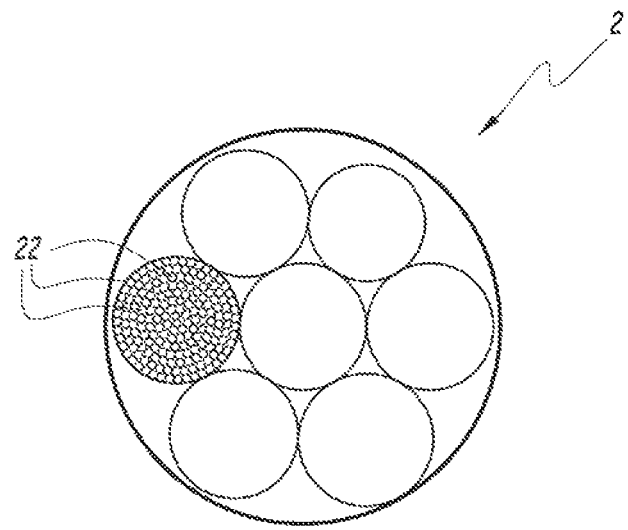
Figure 6:
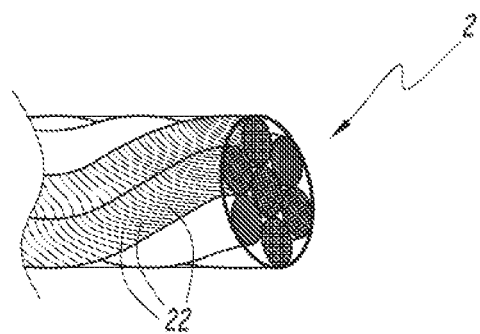

FIG. 4 is a graph, illustrating the variation of the viscosity as a function of the temperature, for different materials; and FIGS. 5-6 are schematic figures illustrating that the matrix comprises a plurality of strands that are helically twisted in a first direction, each of the strands comprising a plurality of filaments or natural origin that are helically twisted in a second direction, which is or is not opposite the first direction.

DETAILED DESCRIPTION OF THE INVENTION

Figure 1:
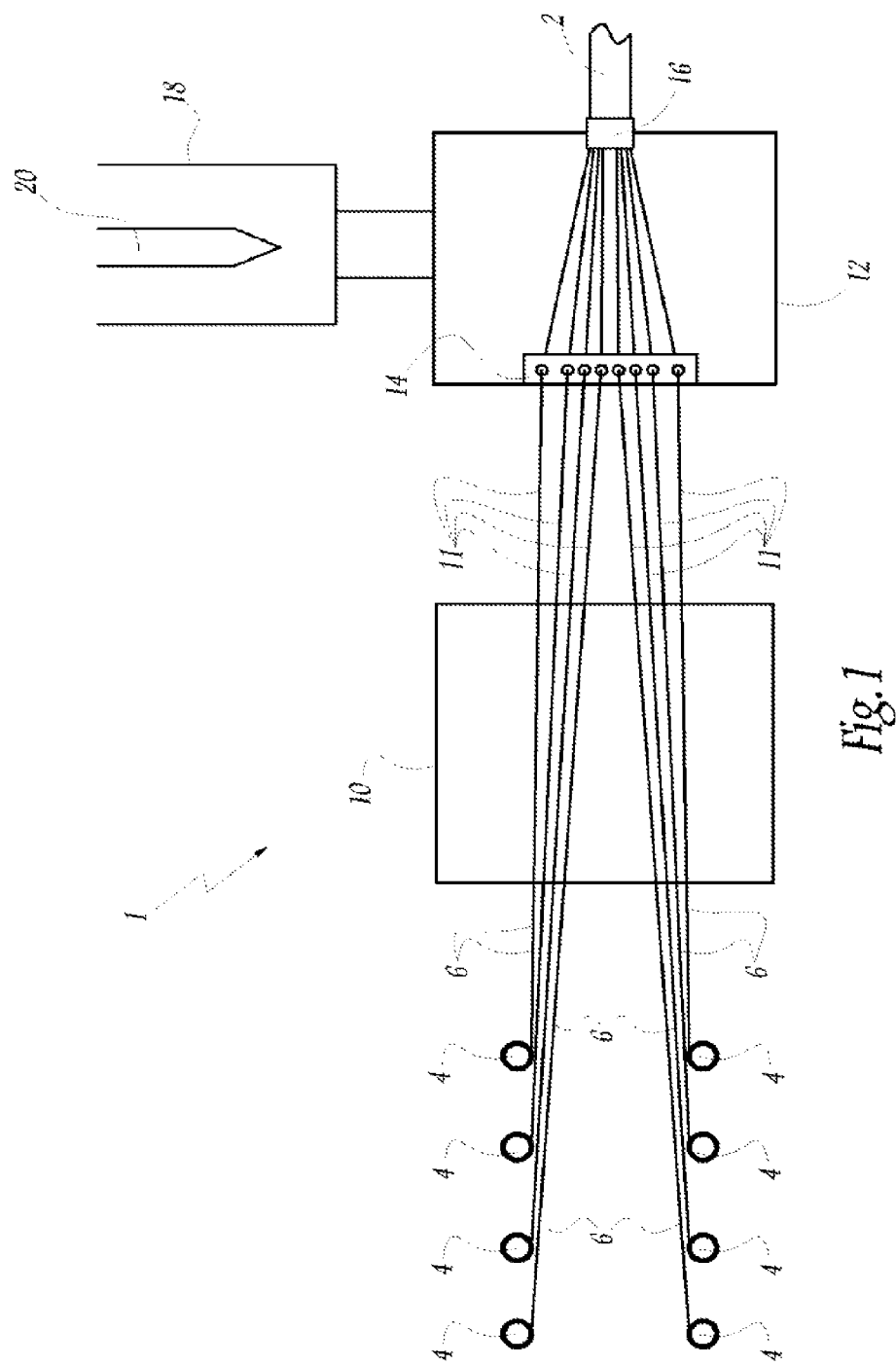
FIG. 1 is a diagrammatic view of an assembly for manufacturing a core for a racket string according to the present invention.

FIG. 1 shows an assembly 1 for manufacturing a core 2 for a racket string. The assembly 1 comprises eight spools 4.

Wound around each of these spools is a plurality 6 of filaments that can be called "multi-filament" or elementary thread. In the following, for simplification reasons, the term "thread" 6 will be used.

It is possible to consider using a different number of spools from what is illustrated. The diameter of the core 2 can then be varied. All of the filaments of the thread 6 are of natural origin. It is also possible to provide for only one or several of these filaments to be of natural origin. Advantageously, these filaments can be made from silk, the silk being able to be produced by a silkworm, a spider, or a genetically-modified animal capable of producing silk. In this respect, it will be noted that these spider genes have been grafted on a goat and a silkworm.

Within the meaning of the invention, a filament of natural origin is a filament essentially made from silk of plant or animal origin, processed or not processed, extracts from animal tissue or animal secretions, processed or not processed, plant fibers, in particular from cotton, flax, or other plants.

The material of natural origin may have been processed mechanically or chemically, for example by braiding or acid treatment.

To manufacture such a thread 6, it is possible to provide for making a bundle of several filaments of natural origin by grouping them together. Helical twisting is then done in a given direction relative to the central axis of the bundle of filaments thus defined. A strand is thus obtained whereof the mechanical strength is essentially ensured by the twisting. See FIGS. 5-6.

It is also possible to provide for assembling a plurality of strands in the form of a bundle. Their cohesion is then ensured by helical twisting in a direction opposite the twisting previously done. By performing a so-called S twisting first, then a so-called Z twisting second, i.e. in a direction opposite to the S twisting, the cohesion and strength of the thread 6 are thus increased. For example, the strands can comprise between 5 and 15 filaments of natural origin, and preferably between 7 and 10 filaments. Likewise, it is possible to choose to assemble between 5 and 15 strands, preferably between 7 and 10. It may be provided to perform both twistings in the same direction.

The assembly 1 also comprises a tub 10, which contains a pretreatment liquid developed from a thermoplastic protective material dissolved in a solvent, at ambient temperature and atmospheric pressure. Advantageously, this material can be a polyurethane or a polyamide.

The threads 6, which are taken into the tub 10, emerge therefrom coated and/or impregnated with the thermoplastic material. These treated threads, thus coated and/or impregnated, are assigned reference 11.

The assembly 1 also comprises an extruder head 12, having a hollowed guide 14 with eight holes. Each of the holes allows the passage of each of the eight treated threads 11. The head 12, which comprises a channel 16 at the outlet thereof, is connected to a shaft 18 in which an extrusion screw 20 is arranged. The latter cooperates with a thermoplastic sheathing material, which can be polyamide or polyurethane, the properties of which will be explained below.

FIG. 4 is a graph illustrating the evolution of the viscosity V as a function of the temperature T, at atmospheric pressure. On this graph, the curve C is reported relative to a material that can be used by the invention. It will be noted that, normally, the viscosity decreases with the temperature, i.e. the more the temperature increases, the more the considered material becomes fluid.

In this FIG. 4, $T_M$ denotes a threshold temperature, beyond which the filaments of natural origin, described above, can be damaged. $V_S$ also denotes the threshold viscosity, above which the material is not adapted to the extrusion process. This threshold value $V_s$ corresponds to a temperature denoted $T_m$.

It will be seen that, upon reading the curve, it is possible to delimit a working zone shown by a cross-hatched quadrilateral. Outside that working zone Z, the method according to the invention cannot be implemented. In fact, for a temperature above the threshold temperature, or maximum temperature $T_M$, the extrusion process will lead to the destruction of the filaments of natural origin.

However, for a temperature below $T_m$, i.e. a viscosity above $V_S$, the extrusion process may not yield industrially satisfactory results. In fact, the threads cannot be correctly impregnated using the material, since the latter is not fluid enough.

In other words, the thermoplastic sheathing material, used by the invention, has a threshold viscosity value, for a temperature value below the threshold maximum temperature. This must be compared to other materials, in particular of the polyethylene type, for which the curve C' is drawn in FIG. 4.

It will be noted that, for temperature $T_M$, the viscosity of this material is greater than the threshold viscosity, such that it is not adapted for the extrusion process. Thus, if one wishes to perform this extrusion with that material, the temperature should be increased to a value denoted T', which is greater than that denoted $T_M$. In other words, using that material for the extrusion process will lead to the destruction of the natural filaments.

Typically, the threshold temperature, beyond which the filaments are damaged, is advantageously below 130° C., also preferably equal to 110° C. Furthermore, the threshold viscosity $V_S$ is advantageously below 2500 Pa·s, preferably equal to 1500 Pa·s. The viscosity V is also greater than a low value $V_m$, advantageously equal to 500 Pa·s, below which the matrix is too liquid and does not allow satisfactory impregnation of the filaments. These viscosity values are calculated according to standard ISO 1133 (100° C./2.16 kg). Lastly, the minimum temperature $T_m$ of the working zone, corresponding to that threshold viscosity, is advantageously greater than 70° C., in particular equal to 90° C.

According to one alternative, the threshold viscosity $V_s$ is advantageously below 180 Pa·s, preferably equal to 50 Pa·s. The viscosity V is also greater than a low value $V_M$ advantageously equal to 50 Pa·s. These viscosity values are calculated according to standard DIN 53018, Brookfield, spindle 29.

During operation, the eight spools 4 are unwound at a speed that may be comprised between 1 and 8 meters per minute, preferably between 2 and 5 meters per minute. The threads 6 then lie in the tub 10. The previously-defined speed is adapted so as advantageously to allow the thermoplastic material to cover and/or impregnate each of the threads.

This impregnation is made easier due to the fact that it is done in the presence of a thermoplastic material, dissolved in a solvent. In fact, the presence of solvent makes it possible to convey that material more easily between the filaments. Each treated thread 11 thus has mechanical characteristics that are substantially identical to those of the thread 6 formed by the different filaments of natural origin.

Each of the treated threads 11 is inserted into the extruder head 12 through the holes of the guide 14. Using the extrusion method, the treated threads 11 are thus coated with the thermoplastic sheathing material. At the outlet of the channel 16, the core 2 is thus obtained. Due to the melting temperature, relative to the thermoplastic sheathing material, the filaments of natural origin are substantially not damaged, during the various steps of their treatment method, described above.

Figure 2:
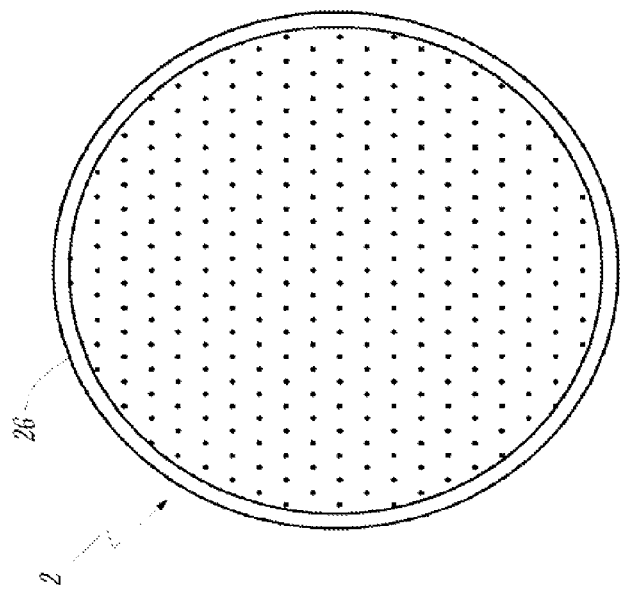
FIG. 2 is a cross-section of a core for a racket string according to a first embodiment of the present invention.

FIG. 2 illustrates a cross-section, showing a core 2 according to the invention. This core for a racket string comprises a plurality of silk filaments 22 embedded in a thermoplastic matrix 24 comprising a mixture of the thermoplastic material coming from the tub 10 and the thermoplastic material coming from the extruder head 12. This component material of the matrix has characteristics substantially similar to those of the thermoplastic material described above, used for the extrusion step. In particular, this matrix 24 can be associated with a viscosity-temperature curve that corresponds substantially to the curve C illustrated and described in reference to FIG. 4.

It is advantageously possible to provide for twisting the core 2, relative to the central axis thereof, at the outlet of the extruder head 12. One then obtains a core having better cohesion as well as better mechanical strength. Advantageously, this twisting can be comprised between 50 and 100 revolutions per minute. FIGS. 5-6 schematically illustrate that the matrix comprises a plurality of strands that are helically twisted in a first direction, each of the strands comprising a plurality of filaments or natural origin that are helically twisted in a second direction, which is or is not opposite the first direction.

Figure 3:
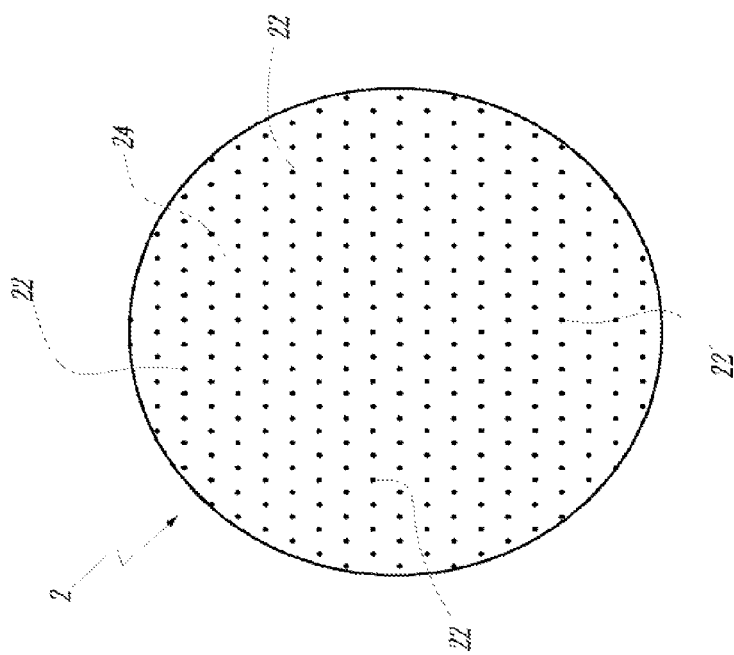
FIG. 3 is a cross-section of a core for a racket string according to a second embodiment of the present invention.

FIG. 3 shows the core 2 around which a protective sheath 26 is arranged. To that end, the core 2 passes into the head of an additional extruder, not shown, while the material serving as protective sheath 26 is worked in pressure and temperature in a shaft of that extruder.

Likewise, it is possible to provide for arranging at least one additional sheath around the sheath 26 using a similar manufacturing method.

Furthermore, the speed of passage of the core 2 in a head of this additional extruder can be higher than the speed of passage of the treated threads 11 in the extruder head 12. Preferably, this speed can be between 50 meters per minute and 100 meters per minute.

The method according to the invention can be applied to degummed silk filaments, i.e. relieved of their protein, as well as non-degummed silk filaments. In this respect, it will be noted that, as one non-limiting example, the treatment facility illustrated in the figures can include an additional tub (not shown). The latter part can perform, in a known manner, an operation such as degumming or de-enzyming.

From the core 2, a string for a racket can be made. The core can be used directly and thus serve to string a racket frame. Alternatively, several cores 2 can be assembled, for example by twisting, then that assembly can be used in other applications. It is also possible to provide for using a protective sheath around said assembly.

The invention claimed is:

1. A core for a racket string, comprising:
a thermoplastic matrix in which filaments are embedded, plural of these filaments being of natural origin, and
the thermoplastic matrix being made of a thermoplastic material which, at a temperature lower than a threshold temperature, at which the filaments are not substantially damaged, has a viscosity suitable for an extrusion process,
wherein the matrix comprises a plurality of strands that are helically twisted in a first direction, each of the strands comprising a plurality of the filaments of natural origin that are helically twisted in a second direction, which is or is not opposite the first direction,
wherein at least one of the filaments of natural origin is a filament made of i) silk of plant or animal origin, processed or not processed, ii) extract from animal tissue or animal secretions, processed or not processed, or iii) plant fibers, and
wherein each of the filaments is impregnated with the thermoplastic material.

2. The core according to claim 1, wherein the threshold temperature is below 130° C.

3. The core according to claim 1, wherein said threshold temperature defines the maximum value of a working temperature range, the minimum value of which corresponds to a threshold viscosity below which the thermoplastic material is adapted to said extrusion process.

4. The core according to claim 3, wherein the minimum temperature is above 70° C.

5. The core according to claim 3, wherein the threshold viscosity is below 2500 Pa·s, this viscosity being measured according to standard ISO 1133.

6. The core according to claim 1, wherein the viscosity of the thermoplastic material of the thermoplastic matrix is greater than 500 Pa·s at 100° C., this viscosity being measured according to standard ISO 1133.

7. The core according to claim 3, wherein the threshold viscosity is below 180 Pa·s, this viscosity being measured according to standard DIN 53018.

8. The core according to claim 1, wherein the matrix comprises a single thermoplastic material.

9. The core according to claim 1, wherein the matrix comprises a mixture of thermoplastic materials.

10. The core according to claim 9, wherein the or at least one of the thermoplastic materials is polyamide or polyurethane.

11. The core according to claim 1, wherein at least one of the filaments of natural origin is a silk filament.

12. The core according to claim 1, further comprising at least one peripheral protective sheath.

13. A string for a racket, comprising at least one core according to claim 1, wherein the string is a tennis racket string.

14. A method for manufacturing a core for a racket string, the core comprising a plurality of filaments, the filaments including at least a filament made from silk of plant or animal origin, processed or not processed, extracts from animal tissue or animal secretions, processed or not processed, or plant fibers the method comprising the following steps:
helically twisting the plurality of filaments in a first direction, then twisting a plurality of strands, comprising a plurality of twisted filaments, helically in a second direction, which is or is not opposite the first direction,
passing the plurality of filaments in a pretreatment liquid comprising a first thermoplastic material dissolved in a solvent, at ambient temperature and atmospheric pressure, and
passing the plurality of filaments in an extruder head supplied with a second thermoplastic material which, at a temperature below a threshold temperature, for which the filaments are not substantially damaged, has a viscosity making it suitable for an extrusion process.

15. The method according to claim 14, wherein the speed of the filaments during the passage in the liquid is adapted to allow absorption of the first thermoplastic material in each of the filaments.

16. The core according to claim 1, wherein the threshold temperature is equal to 110° C.

17. The core according to claim 3, wherein the minimum temperature is equal to 90° C.

18. The core according to claim 3, wherein the threshold viscosity is equal to 1500 Pa·s at 100° C., this viscosity being measured according to standard ISO 1133.

19. The core according to claim 3, wherein the threshold viscosity is equal to 50 Pa·s, this viscosity being measured according to standard DIN 53018.

20. The method of claim 14, wherein the racket string is a tennis racket string.

\* \* \* \* \*